US008289401B2

(12) United States Patent
Pinto et al.

(10) Patent No.: US 8,289,401 B2
(45) Date of Patent: Oct. 16, 2012

(54) PROCESSING OF VIDEO DATA TO COMPENSATE FOR UNINTENDED CAMERA MOTION BETWEEN ACQUIRED IMAGE FRAMES

(75) Inventors: Victor Pinto, Zychron-Yaakov (IL); Itsik Dvir, Haifa (IL)

(73) Assignee: CSR Technology Inc., San Jose, CA (US)

( * ) Notice: Subject to any disclaimer, the term of this patent is extended or adjusted under 35 U.S.C. 154(b) by 82 days.

(21) Appl. No.: 12/767,753

(22) Filed: Apr. 26, 2010

(65) Prior Publication Data

US 2010/0208084 A1 Aug. 19, 2010

Related U.S. Application Data

(63) Continuation of application No. 10/897,186, filed on Jul. 21, 2004, now Pat. No. 7,705,884.

(51) Int. Cl.
*H04N 5/228* (2006.01)

(52) U.S. Cl. ............... 348/208.12; 348/208.1; 348/208.4

(58) Field of Classification Search ............. 348/208.99, 348/208.1, 208.4–208.7, 208.11, 208.12; 382/232, 236
See application file for complete search history.

(56) References Cited

U.S. PATENT DOCUMENTS

| | | | |
|---|---|---|---|
| 4,959,725 A | 9/1990 | Mandle | |
| 5,253,071 A | 10/1993 | MacKay | |
| 5,384,595 A | 1/1995 | Sakaguchi | |
| 5,552,831 A | 9/1996 | Machida et al. | |
| 5,729,295 A | 3/1998 | Okada | |
| 5,748,231 A | 5/1998 | Park et al. | |
| 5,926,212 A | 7/1999 | Kondo | |
| 6,343,100 B1 | 1/2002 | Fujiwara et al. | |
| 6,407,777 B1 | 6/2002 | DeLuca | |
| 6,535,244 B1 | 3/2003 | Lee et al. | |
| 6,628,711 B1 | 9/2003 | Mathew et al. | |
| 7,151,561 B2 | 12/2006 | Lin et al. | |
| 7,158,570 B2 | 1/2007 | Nagumo et al. | |
| 7,218,675 B1 | 5/2007 | Takahashi | |
| 7,705,884 B2 * | 4/2010 | Pinto et al. | ............... 348/208.99 |
| 2002/0118761 A1 | 8/2002 | Lee | |
| 2004/0001147 A1 | 1/2004 | Vella et al. | |
| 2004/0005084 A1 | 1/2004 | Kondo et al. | |

(Continued)

FOREIGN PATENT DOCUMENTS

GB 2366113 A 2/2002

(Continued)

OTHER PUBLICATIONS

EPO, "Office Action" corresponding European Patent Application No. 05 766 898.0 on Sep. 18, 2007, 5 pages.

(Continued)

*Primary Examiner* — Daniel M Pasiewicz
(74) *Attorney, Agent, or Firm* — Frommer Lawrence & Haug LLP; John W. Branch

(57) ABSTRACT

Video data that includes a plurality of images acquired over time are processed in an apparatus immediately after acquiring the video data, or during some later post-processing of the video data, to reduce the effects of unintended motion in the acquired images. Coarse and fine compensation for motion is performed on video frames that correspond to the acquired images. A coarse compensation value is employed to compress each video frame that is both coarse and fine motion compensated.

8 Claims, 7 Drawing Sheets

U.S. PATENT DOCUMENTS

| | | |
|---|---|---|
| 2004/0027454 A1 | 2/2004 | Vella et al. |
| 2004/0100560 A1 | 5/2004 | Stavely et al. |
| 2004/0201705 A1 | 10/2004 | Lin et al. |
| 2005/0163348 A1 | 7/2005 | Chen |
| 2005/0179784 A1 | 8/2005 | Qi |
| 2005/0248661 A1 | 11/2005 | Stanvely et al. |
| 2005/0275727 A1 | 12/2005 | Lai et al. |
| 2006/0061658 A1 | 3/2006 | Faulkner et al. |
| 2006/0152590 A1 | 7/2006 | Kage et al. |

FOREIGN PATENT DOCUMENTS

| | | |
|---|---|---|
| JP | H05-304648 A | 11/1993 |
| JP | H06-225289 A | 8/1994 |
| JP | H09-130748 A | 5/1997 |
| JP | H10-051787 A | 2/1998 |
| WO | WO 99/12355 | 3/1999 |

OTHER PUBLICATIONS

EPO/ISA, "Notification of Transmittal of the International Search Report and the Written Opinion of the International Searching Authority, or the Declaation," mailed in related International Application No. PCT/US2005/021336 on Nov. 3, 2005, 10 pages.

* cited by examiner

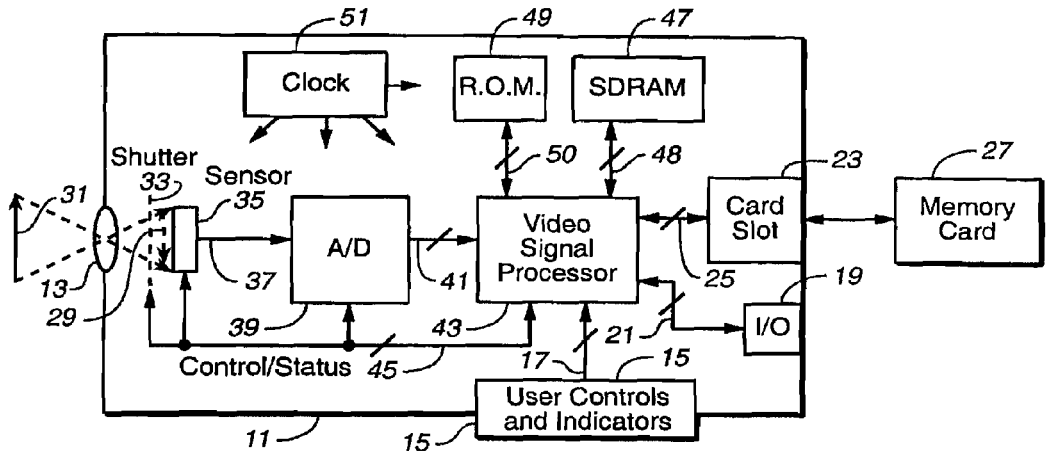
FIG._1
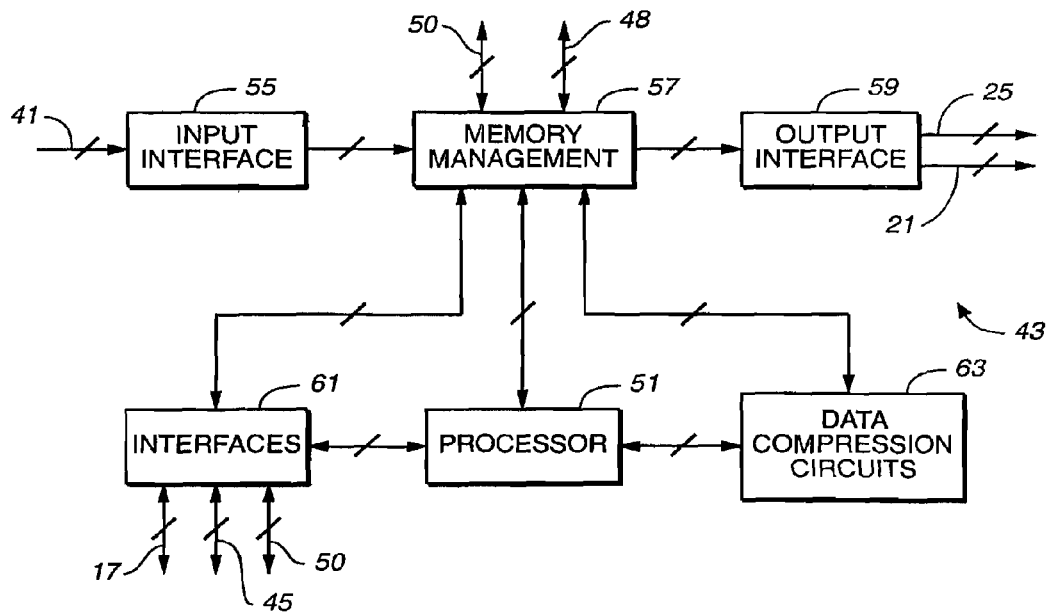
FIG._2

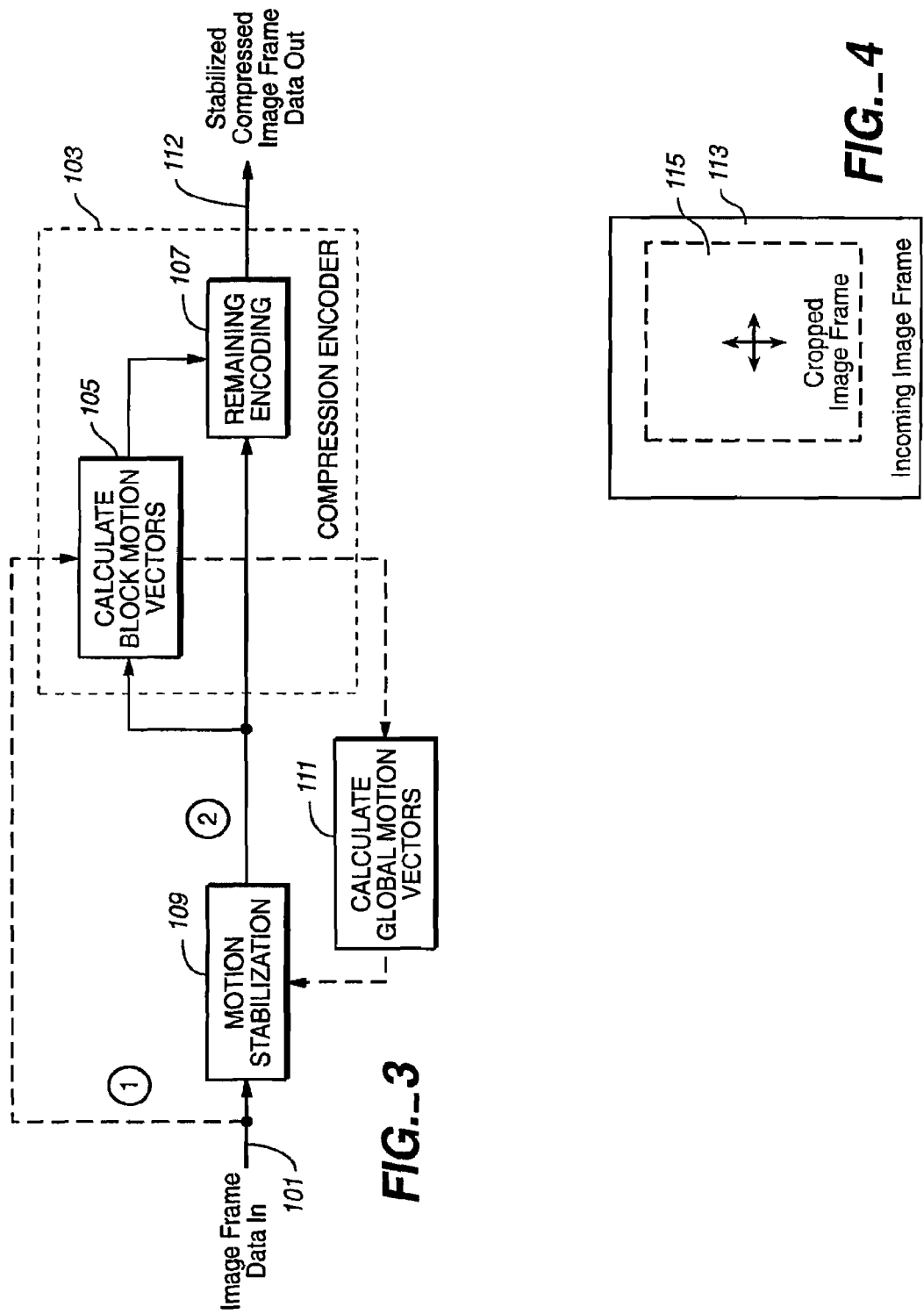

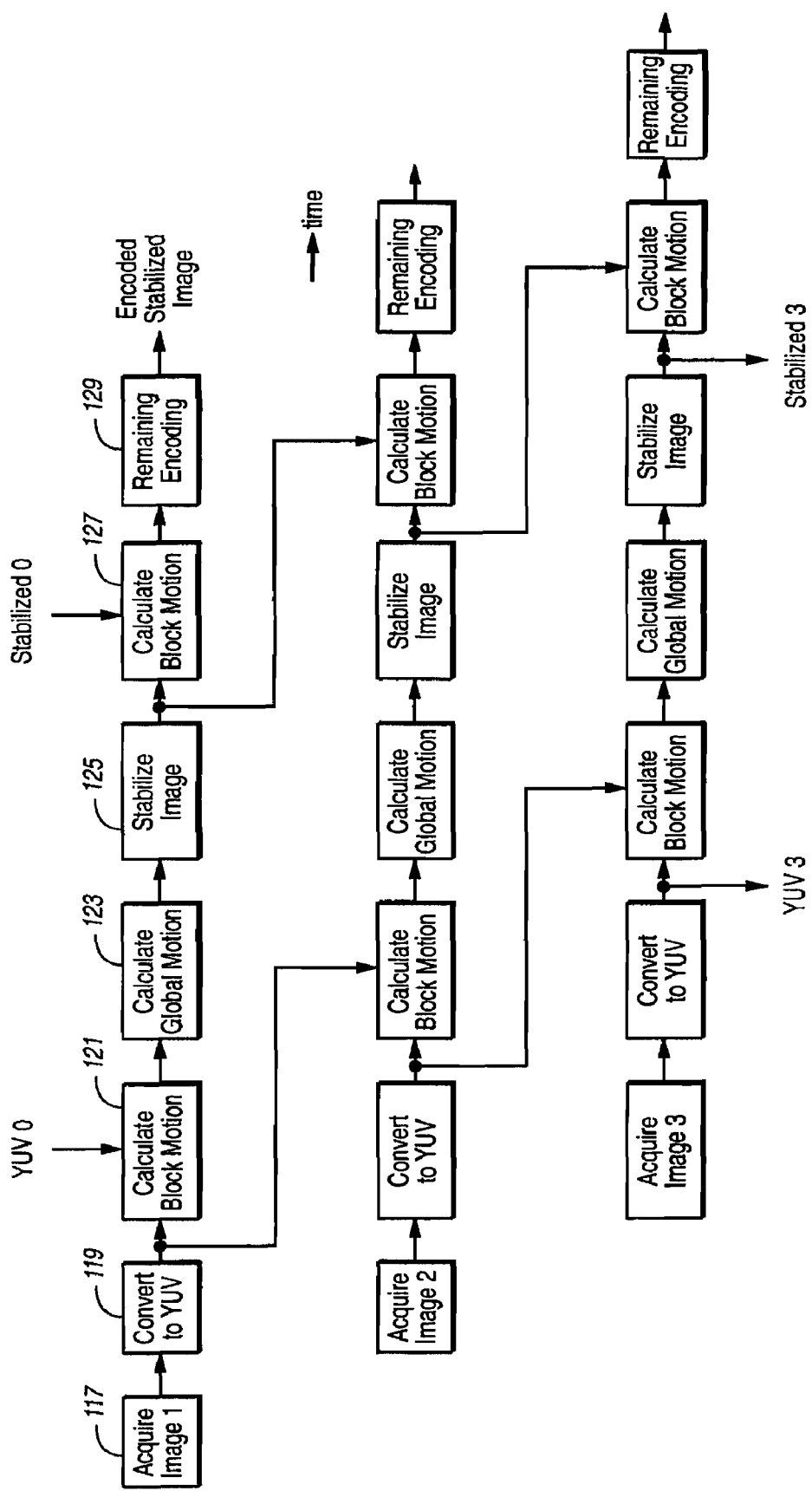
FIG._5

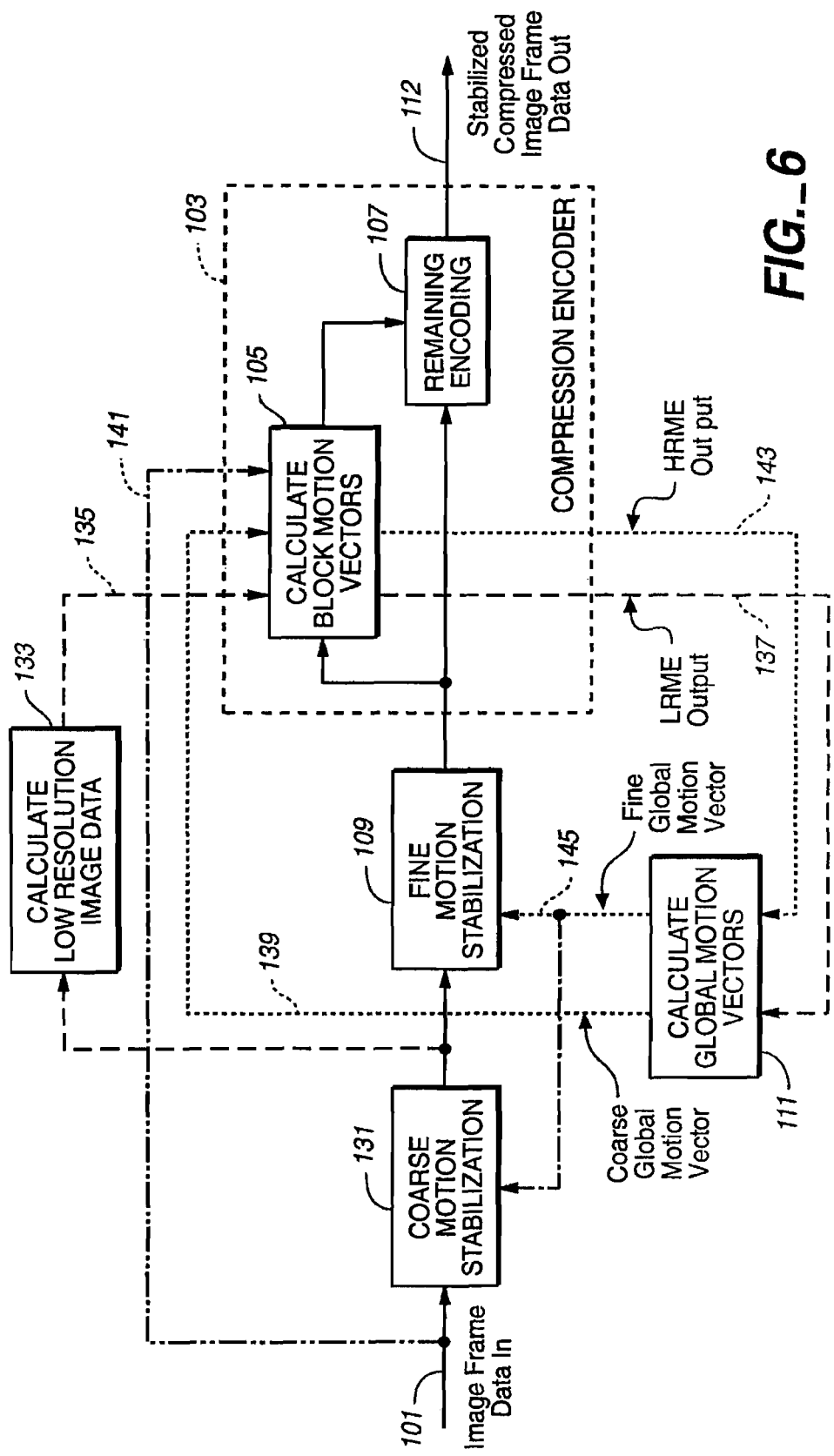
FIG._6

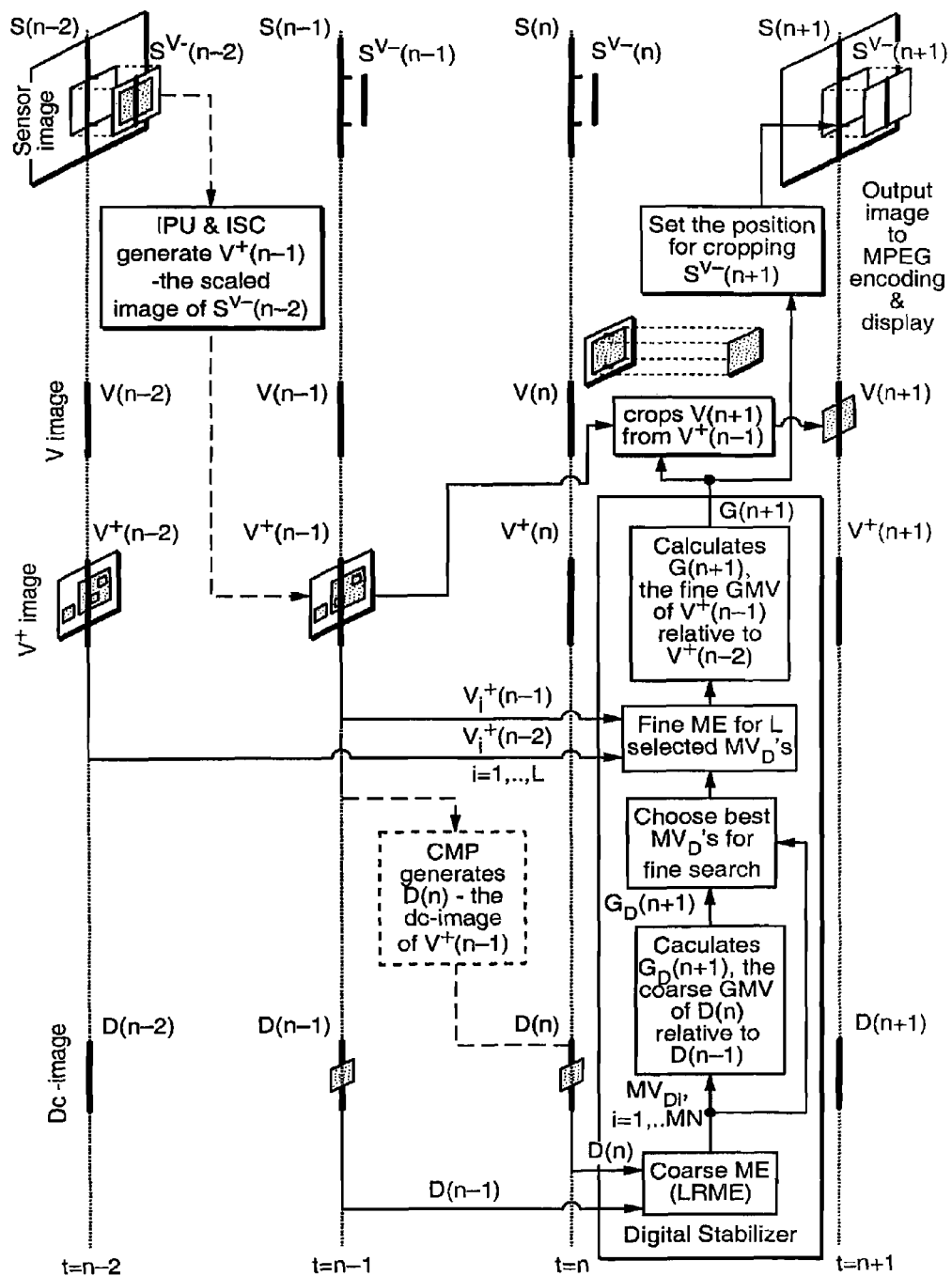
FIG._7 x x x x x x x x x x x x x x x x x x x x x x x x
x x x x x x x x x x x x x x x x x x x x x x x x
x x x x x x x x x x x x x x x x x x x x x x x x
x x x x x x x x x x x x x x x x x x x x x x x x
x x x x x x x x x x x x x x x x x x x x x x x x
x x x x x x x x x x x x x x x x x x x x x x x x
x x x x x x x L L L L L L L L x x x x x x x x
x x x x x x x L L L L L L L L x x x x x x x x
x x x x x x x L L L L L L L L x x x x x x x x
x x x x x x x L L L L L L L L x x x x x x x x
x x x x x x x L L L L L L L L x x x x x x x x
x x x x x x x L L L L L L L L x x x x x x x x
x x x x x x x x x x x x x x x x x x x x x x x x
x x x x x x x x x x x x x x x x x x x x x x x x
x x x x x x x x x x x x x x x x x x x x x x x x
x x x x x x x x x x x x x x x x x x x x x x x x
x x x x x x x x x x x x x x x x x x x x x x x x
x x x x x x x x x x x x x x x x x x x x x x x x

*FIG._8*

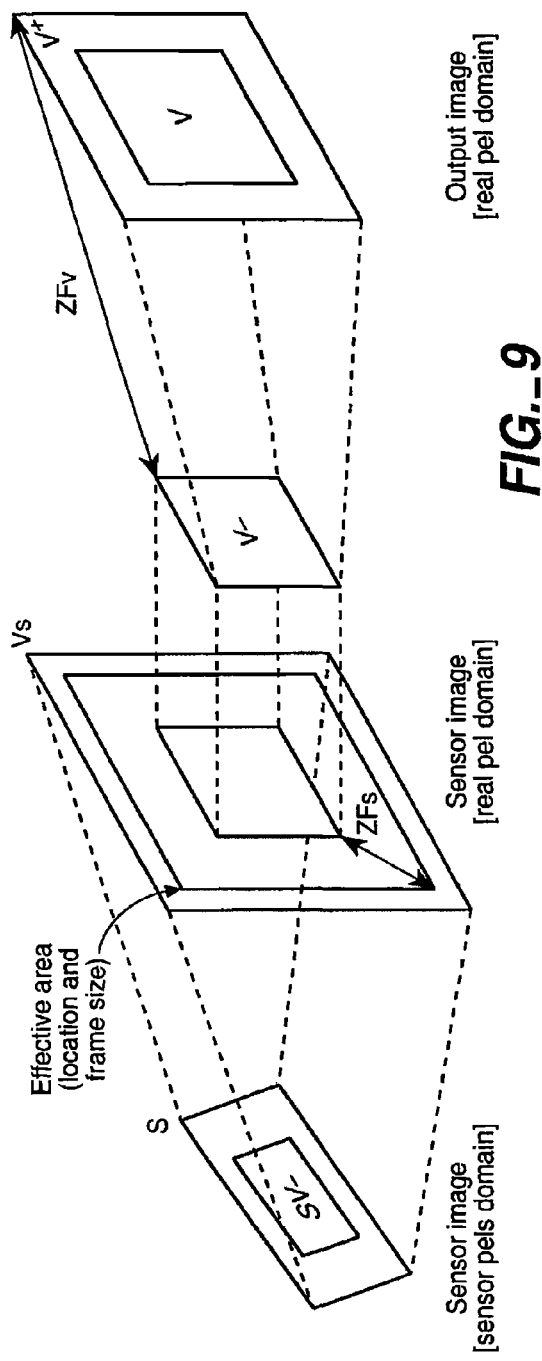
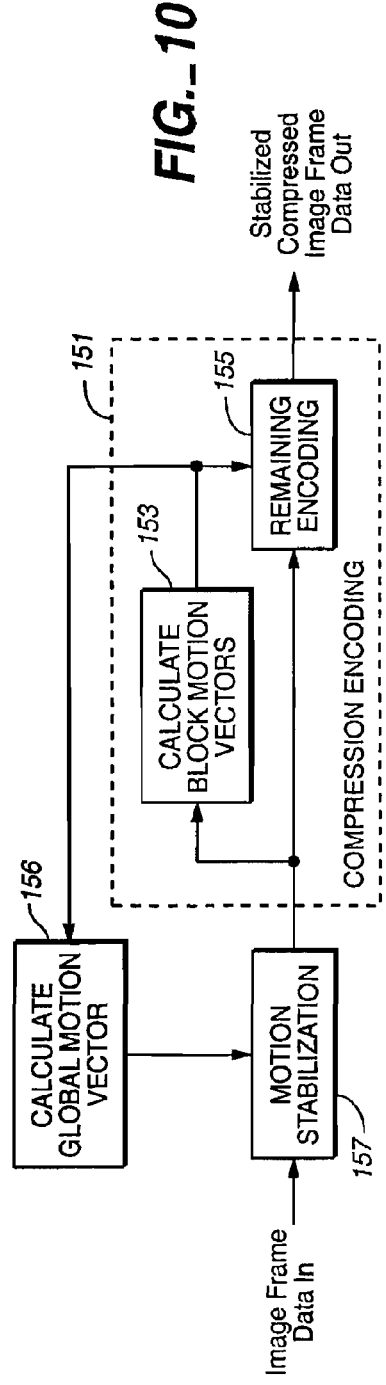
FIG._9
FIG._10

PROCESSING OF VIDEO DATA TO COMPENSATE FOR UNINTENDED CAMERA MOTION BETWEEN ACQUIRED IMAGE FRAMES

CROSS-REFERENCE TO RELATED APPLICATION

This utility patent application is a Continuation of U.S. patent application Ser. No. 10/897,186, filed on Jul. 21, 2004 and allowed on Dec. 15, 2009, the benefit of which is claimed under 35 U.S.C. §120, and is further incorporated herein by reference.

BACKGROUND OF THE INVENTION

This invention relates generally to the processing of video data, and, more specifically, to stabilization of moving images acquired by a camera or other video acquisition device that is subject to unintentional shaking.

The holding or movement of a camera by hand during the taking of a series of video frames without shakes or jitters is quite difficult, particularly when the camera is very small and light. The trend is for the size of both digital still cameras having the ability to take short film clips and video motion picture cameras, such as camcorders, to be made smaller and lighter. Video image sequences are also taken by mobile phones and portable digital assistants (PDAs), which are also very small. The resulting shaking results in recording moving images that are very irritating to watch, being most noticeable in scenes that do not include large movements of objects in them. It is therefore desirable to compensate in some manner for this and other undesired camera motion.

One class of image stabilizing cameras contains a pair of very small gyroscopes mounted within the camera with their axes perpendicular to each other. When the camera moves, the gyroscopes offer resistance to the movement and produce force vectors in a direction opposite to that of the camera's motion. An electrical control signal proportional to these force vectors is used to compensate for random and/or cyclic movements of the camera while acquiring image frames, thereby to stabilize the images. This can be done either mechanically or electronically. Mechanically, the optical axis of the camera may be moved to reposition the image projected onto the sensor in a direction opposite to that of the camera shake. Movement of a gimbal mounted camera lens is often used to perform this repositioning. The sensor may alternatively be moved by the stabilization signal. Electrically, the camera may contain a processing circuit that is responsive to the stabilization signal to shift the output of the image sensor both horizontally and vertically, in order that the image remains stable over multiple frames.

Other image stabilization techniques, which do not require the use of gyroscopes or any other mechanical reference, detect global (overall) movement of the image between two successive frames as part of the signal compensation. The later acquired image is then electronically repositioned to eliminate movement caused by camera shaking. These techniques are most commonly implemented by separately adding to a camera a motion estimation capability that is dedicated to image stabilization.

SUMMARY OF THE INVENTION

In order to simplify this later technique of image stabilization, certain processing steps of a data compression algorithm are also used for image stabilization, rather than performing these functions independently of each other. Since video data compression is usually performed anyway, this reduces the additional amount of processing necessary to add the further feature of image stabilization. Specifically, some or all of the process used by the data compression algorithm to calculate motion vectors between successive image frames, or the resulting motion vectors themselves, are also used by the image frame stabilization algorithm. For image stabilization, global vectors of the amount of relative motion between the overall image frames are determined from the motion vectors used for data compression. These global motion vectors are then used to stabilize the image. In one example, a sensor larger than the size of the image frame being acquired is used so that the portion of the sensor output data selected for the image frames may be moved in response to the global image motion vectors in a manner to compensate for unwanted jitter, which is a form of image cropping. The stabilization processing may take place either in the video acquisition device at the time of acquiring the image frames or later during post-processing of image data in a personal computer or the like.

In a specific implementation within a camera or other video acquisition device, circuits are provided on an image processing integrated circuit chip that are dedicated to the calculation of at least some of the image motion vectors used for compression of the video data. These circuits are then used to generate these motion vectors of image components from the sensor output data both for use in stabilizing the image and to compress the data of the stabilized image. The global motion vectors used for stabilizing the image may be calculated in software from the motion vectors of image components that are estimated by the dedicated circuitry. This reduces the complexity of adding the motion stabilization function to video acquisition devices by using processing capability that already exists. There is no need to duplicate the function of the image component motion estimation circuits that are already included in the video acquisition device for data compression.

Another feature of the present invention, which may be employed either in conjunction with the foregoing or as part of some other image stabilization technique, is the pre-stabilization of the individual image frames as they are acquired. Data of a current image frame is initially spatially shifted an amount based upon a stabilization calculation made from data of a preceding image frame or frames. There is then usually less motion that must be removed by the full image stabilization process.

A further feature of the present invention utilizes such "pre-stabilization" as the only image stabilization that takes place. Although this process does not use data of the current image to calculate the global motion vector used to stabilize it, this greatly simplified process may be sufficient for motion stabilization of a succession of images acquired at a high frame rate when the camera jitter is a small and/or of a low frequency.

Additional aspects, advantages and features of the present invention are included in the following description of exemplary examples thereof, which description should be taken in conjunction with the accompanying drawings. All patents, patent applications, articles and other publications referenced herein are hereby incorporated herein by this reference in their entirety for all purposes.

BRIEF DESCRIPTION OF THE DRAWINGS

FIG. 1 is a block diagram illustration of a camera or other video acquisition device in which the techniques of the present invention may be implemented;

FIG. 2 is a block diagram of a portion of the electronic processing system of the device of FIG. 1;

FIG. 3 is a functional flow diagram showing motion stabilization and compression processes carried out in the camera of FIGS. 1 and 2, according to a first embodiment;

FIG. 4 illustrates a technique of variably cropping an image frame to stabilize an image, as can be used in the process of FIG. 3;

FIG. 5 illustrates the relative timing to acquire, compensate and compress data of a sequence of image frames, according to the first embodiment;

FIG. 6 is a functional flow diagram showing motion stabilization and compression processes carried out in the camera of FIGS. 1 and 2, according to a second embodiment;

FIG. 7 illustrates a specific processing example to acquire and compensate data for unwanted motion between a sequence of image frames, according to the second embodiment;

FIG. 8 shows the operation of one component of the processing example of FIG. 7, namely coarse motion estimation (LRME);

FIG. 9 illustrates image cropping used in the processing example of FIG. 7; and

FIG. 10 is a functional flow diagram showing motion stabilization and compression processes carried out in the camera of FIGS. 1 and 2, according to a third embodiment.

DETAILED DESCRIPTION OF EXEMPLARY EMBODIMENTS

Video data acquired by a digital camera are typically processed to compensate for imperfections of the camera and to generally improve the quality of the image obtainable from the data. The correction for any defective pixel photodetector elements of the sensor is one processing function that may be performed. Another is white balance correction wherein the relative magnitudes of different pixels of the primary colors are set to represent white. This processing may also include de-mosaicing the individual pixel data to superimpose data from spatially separate monochromatic pixel detectors of the sensor to render superimposed multi-colored pixels in the image data. This de-mosaicing then makes it desirable to process the data to enhance and smooth edges of the image. Compensation of the image data for noise and variations of the camera optical system across the image and for variations among the sensor photodetectors may also be performed. Other processing typically includes one or more of gamma correction, contrast stretching, chrominance filtering and the like. The processed data are then usually compressed by use of a commercially available algorithm before storage in a non-volatile medium.

Such data processing may be performed in a personal computer on raw image data earlier acquired by the camera, may be performed in the camera itself or some of the processing done in the camera and other of the processing done later in a personal computer. This processing may also include compensation for the effects of unwanted shake or jitter of the camera during the acquisition of a series of image frames that form a moving image. Compensation for such jitter to stabilize the series of image frames is the principle subject of the following description, particularly when combined with data compression. This processing is preferably done within the hand-held camera so that compensated video data is stored in a non-volatile memory associated with the camera any may thus be viewed directly, but this processing can alternatively be performed during post-processing the camera data in a personal computer or the like.

Video Camera Example

In FIG. 1, such a camera is schematically shown to include a case 11, an imaging optical system 13, user controls and indicators 15 that generate and receive control signals 17, a video input-output receptacle 19 with internal electrical connections 21, and a card slot 23, with internal electrical connections 25. A non-volatile memory card 27 is removably inserted into the card slot 23. Data of images captured by the camera may be stored on the memory card 27 or in an internal non-volatile memory (not shown). Image data may also be outputted to another video device through the receptacle 19. The memory card 27 can be a commercially available semiconductor flash electrically erasable and programmable read-only-memory (EEPROM), small removable rotating magnetic disk or other non-volatile memory to which video data can be programmed by the camera. Alternatively, particularly when the camera is taking movies of thirty image frames per second or the like, larger capacity storage media can be used instead, such as magnetic tape or a writable optical disk.

The optical system 13 can be a single lens, as shown, but will normally be a set of lenses. An image 29 of a scene 31 is formed in visible optical radiation through a shutter 33 onto a two-dimensional surface of an image sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern, where the rows of photo-detectors are scanned one at a time from left to right, beginning at the top row, to generate a frame of video data from which the image 29 may be reconstructed. The analog signal 37 is applied to an analog-to-digital converter circuit chip 39 that generates digital data in circuits 41 of the image 29. Typically, the signal in circuits 41 is a sequence of individual blocks of digital data representing the intensity of light striking the individual photo-detectors of the sensor 35.

The photo-detectors of the sensor 35 typically detect the intensity of the image pixel striking them in one of two or more individual color components. Early sensors detect only two separate colors of the image. Detection of three primary colors, such as red, green and blue (RGB) components, is common. Currently, image sensors that detect more than three color components are becoming available.

Processing of the video data in circuits 41 and control of the camera operation are provided, in this embodiment, by a single integrated circuit chip 43. In addition to being connected with the circuits 17, 21, 25 and 41, the circuit chip 43 is connected to control and status lines 45. The lines 45 are, in turn, connected with the shutter 33, sensor 29, analog-to-digital converter 39 and other components of the camera to provide synchronous operation of them. A separate volatile random-access memory circuit chip 47 is also connected to the processor chip 43 through lines 48 for temporary data storage. Also, a separate non-volatile memory chip 49 is connected to the processor chip 43 through lines 50 for storage of the processor program, calibration data and the like. The memory 49 may be flash memory, which is re-programmable, or a memory that is programmable only once, such as a masked programmable read-only-memory (PROM) or an electrically programmable read-only-memory (EPROM). A usual clock circuit 51 is provided within the camera for providing clock signals to the circuit chips and other components. Rather than a separate component, the clock circuit for the system may alternatively be included on the processor chip 43.

A general block diagram of the processor chip 43, including portions that stabilize and compress image data, is given in FIG. 2. A processor 51, which may be general purpose or dedicated to the tasks herein, performs calculations on the image data and controls operation of the camera, in response to firmware stored in the flash memory 49 (FIG. 1). Digital data of successive image frames are received over lines 41 by an interface circuit 55 through input contacts on the chip 43, and then communicated with other system components by connection through a memory management unit 57. Video data of the successive image frames, after stabilization and compression, are outputted through an interface circuit 59 to lines 21 (to the input-output receptacle 19 of FIGS. 1) and 25 (to the flash memory card slot 23 of FIG. 1) that are connected to output contacts on the chip 43. Interface circuits 61 communicate between the lines 17, 45 and 50 (see FIG. 1) and the processor 51 and memory management unit 57.

Circuits 63 of FIG. 2, also connected with the processor 51 and memory management unit 57, are included in this embodiment to perform at least some of the calculations necessary to compress the data of successive image frames before being output through the interface circuits 59. This can be more efficient than employing the processor 51 to make the calculations under control of the firmware. An estimation of motion between successive image frames is part of a typical compression technique. In the current MPEG-4 algorithm, motion vectors are calculated for various blocks of two successive image frames to estimate motion of portions of the image between them. A circuit to make at least a portion of this block motion vector calculation is included within the compression calculation circuits 63.

An image block motion calculation may also be included as part of an algorithm that compensates for unwanted jitter of the camera between acquisitions of successive image frames. Therefore, at least part of the block motion vectors used for jitter compensation are preferably also calculated by the circuits 63, as described further below. Whatever calculations required for data compression and camera jitter compensation in addition to those made by the dedicated circuits 63 are then performed by the processor 51 under firmware control First Embodiment of Video Stabilization and Compression FIG. 3 illustrates operation of the processor of FIG. 2, according to one general embodiment, to stabilize a moving image and compress the stabilized image data. An input 101 to the processing includes data of successive image frames derived from data acquired from the sensor 35 (FIG. 1). As is typical with compression techniques, data of two successive images are used by a compression encoder to generate compressed data of the current image frame at an output 112. Motion estimate vectors are calculated from various blocks of both images by a portion 105 of the encoder to provide data of motion of the current image with respect to the immediately preceding image. These motion vectors are then utilized by remaining portions 107 of the encoder to encode the current image. Data of the acquired image frames are compressed one at a time by a standard compression algorithm such as one that provides compressed data according to the MPEG-4 standard.

What has been added to this compression encoding is motion stabilization processing 109 that uses the image block motion estimation 105 of the encoder 103. If the image motion processing 105 is implemented in software, duplication of software code to perform the same function as part of the motion stabilization processing 109 is eliminated. Similarly, if the block motion estimating 105 is implemented by the hardwired logic circuitry 63 as part of the processor 43 (FIGS. 1 and 2), as is preferred, then the same motion processing takes place during both stabilization and compression by passing different video data through the circuitry on each occasion.

The motion processing 105 calculates estimates of movement of different blocks of an image between successive image frames. This is one way that compression algorithms estimate motion as part of the encoding, referred to as block matching. Others methods of motion estimation are gradient matching and phase correlation. What is needed for the motion stabilization processing 109, however, is an estimate of an overall motion between successive image frames. Therefore, global processing 111 takes the motion estimate vectors calculated for an individual block of the image by processing 105 and generates a global motion estimate vector from them. The global motion vectors calculated for successive images are then used by the motion stabilization processing 109. A statistical value of the block motion vectors between two image frames may be calculated to provide the global motion vector, which is an estimate of the overall motion of the image between successive frames. In a specific example, a mean or median value of the block motion vectors is calculated.

The sequence of using the block motion calculator 105 (FIG. 3) of the compression encoder 103 for the motion stabilization calculation 109 will now be explained. A current image frame received at the input 101 first has its block motion vectors calculated by 105 with respect to the immediately preceding image frame. Those vectors are then used by the processing 111 to calculate a global motion vector between the current and the immediately preceding image frames. The global motion vectors are then used by the processing 109 to stabilize the current image frame for any unwanted motion that has occurred in the image since the immediately preceding frame. An output of the processing 109 are data of the current image frame that has been motion stabilized.

It is the stabilized current image that is then compressed by the encoder 103. Block motion vectors are again calculated by the processing 105 but this time between data of the current stabilized image and those of the immediately preceding stabilized image. Those vectors are then used by remaining compression processing 107 to compress the current motion stabilized image frame, then provided at an output 112. The process of FIG. 3 is repeated for each newly acquired image frame, the block motion vectors being calculated from data of the new image frame with respect to data of the immediately preceding acquired image frame. The result is data at the output 112 of a succession of stabilized image frames that are compressed. This data may be stored, such as on a non-volatile memory card when the processing takes place in a video acquisition device, may be transmitted, such as over the Internet, or the like.

A preferred technique for stabilizing the image (processing 109 of FIG. 3) is illustrated in FIG. 4. The image sensor 35 (FIG. 1) is made large enough that it provides data of an image frame 113 that is larger than a desired resulting stabilized image frame 115 having a defined size. The acquired image frame 113 is cropped to the size of the image frame 115 by defining horizontal and vertical coordinates of the stabilized image frame 115 according to the magnitude of the global image motion vector calculated for the image frame by the processing 111. As the magnitude of the global motion vector changes between image frames, the image frame 115 moves horizontally and vertically within the acquired image frame 113. This is used to compensate for unwanted global motion between successive image frames.

The combined image stabilization and compression of FIG. 3 is shown in FIG. 5, wherein the pipelined nature of the processing becomes clear. That is, the process of stabilizing and compressing data of one image frame need not be completed before the process starts on the next image frame in sequence. The sequence of operations on data of each image frame is the same but shifted in time. In one example sequence, data of image frame 1 is acquired at 117. This data will usually be a series of values of primary colors (such as "RGB," red, green and blue) obtained by scanning a two-dimensional pattern of single color photodetectors that typically forms the sensor 35 (FIG. 1). For processing, it is preferred to convert this sensor output into a standard luminance and chrominance format (YUV), so this is done at 119. Next, at 121, the block motion vectors for the image frame 1 are calculated, using YUV data of the immediately preceding image frame 0 and the processor of the compression encoder 103 (FIG. 3). At 123 of FIG. 5, a global motion vector is calculated from image frame 1 from those block motion vectors. The global motion vector is then used to stabilize the image frame 1, at 125, preferably in the manner described with respect to FIG. 4.

The next two steps 127 and 129 compress data of the stabilized image frame. At 127, block motion vectors are calculated for the stabilized image frame 1, using data of the immediately preceding stabilized image frame 0, by a second use of the processing circuit 105 (FIG. 3), followed at 129 by the remaining compression encoding processing. The resultant output is the data of the acquired image frame 1 that has been stabilized and compressed.

The same time sequence of processing steps occurs for data of each succeeding image frame, image frames 2 and 3 additionally shown in FIG. 5. Data of a new image frame is acquired as soon as data from the immediately preceding frame has been read from the sensor, usually after the image frame data are written into a buffer memory. Many of the subsequent data processing operations can be performed concurrently since the several calculations are made by different portions of the signal processor. In particular, use of circuits 63 (FIG. 2) dedicated to the calculation 105 (FIG. 3) of image block motion vectors frees up the processor to concurrently perform a different task. The concurrency of the processing steps will, of course, depend upon the particular image data processing system being utilized. The particular processing shown by FIG. 5 as occurring at the same time may not do so, depending upon the specific structure and operation of the processor 51 and circuits 63 (FIG. 2).

In the specifics of this first embodiment, and in the second embodiment below as well, a global motion vector is calculated for a current image frame with respect to an immediately preceding acquired image frame. But the techniques are not limited to this. For example, an earlier preceding image frame may be used, such as one occurring two, three or more image frames before the current one being stabilized. Also, an image frame occurring after the current image frame may be used instead. As a further alternative, multiple image frames may be used in addition to the current image frame, such as one or more image frames before and one or more frames after the current frame, two or more image frames before or two or more frames after the current frame. Additionally, there may be no need to use data of the current image frame to calculate a global motion vector with respect to it. If enough memory exists, data of any number of such image frames may be compared in order to calculate a global motion vector with respect to the current image frame that provides a better estimate of that motion. However, if the frame rate is fast enough, the use of more than two image frames may not appreciably improve the result.

Second Embodiment of Video Stabilization and Compression

A first difference between this second and the first embodiment is an added initial pre-stabilization of the incoming image frame based upon the global motion vector calculated for the immediately preceding image frame. A second difference is that the calculation of the global motion vector used to stabilize an image may be made in two stages. A coarse global motion vector is calculated from a low-resolution version of the image, and this coarse vector used to sort through the block motion vectors of the full resolution image to find the most relevant vectors for the purpose of motion stabilization. Only the fewer selected relevant block vectors then need to be considered when calculating the global motion vector from them. These two additions to the processing illustrated in FIG. 3 can either be used together or just one of them included.

Referring to FIG. 6, processing with these two additions is illustrated in a diagram that is similar to that of the first embodiment's FIG. 3, wherein common processing functions are indicated by the same reference numbers. In the first processing addition, pre-stabilization 131 of the acquired image frame is accomplished by using a global motion vector calculated by the processing function 111 when stabilizing the immediately preceding image frame. Therefore, the pre-stabilization 131 is not based upon motion of the current image frame. Rather, it is based on the motion occurring between two earlier frames as a rough estimate of the motion that may have occurred in the current image frame. An estimate of the actual motion between the current image frame and the previous image frame is then calculated in the manner of the first embodiment described with respect to FIG. 3. But the starting point is the pre-stabilized image frame data, which then reduces the amount of processing that is necessary in the final motion stabilization calculation 109.

In the second processing addition of the second embodiment of FIG. 6, low resolution versions of the incoming image frame data are formed at 133. One convenient way to do so is to represent data from a group of sensor pixels, such as a block of 8×8 pixels, as if the block was a single pixel. This may be done by an arithmetic process such as by averaging the values of all the pixels of the block to obtain the single value. This is done for each of the sensor's colors.

Block motion vectors are then calculated from the low-resolution image data output of 133 by passing data of two low-resolution image frames over a path through the block motion vector processing 105. The resulting block motion vectors in a path 137 are then processed at 111 to obtain a coarse global motion vector in a path 139. That coarse (low resolution) global motion vector is then used during the processing 105 to aid in selecting the blocks of input data of two successive image frames in a path 141 to be compared in the course of calculating fine block motion vectors. The resulting multiple block motion vectors, in a path 143, are then processed at 111 to obtain a fine global motion vector in a path 145. This vector is then used for the final image frame stabilization 109.

The stabilized image output of 109 is then compressed by the encoder 103, as described with respect to FIG. 3. It should be noted that the dedicated processing 105 that calculates block motion vectors between two successive image frames is used three times in this embodiment. Low resolution image frame data in the path 135 is input to it as part of a low resolution motion estimator ("LRME" output in line 137), high resolution image frame data in the path 141 as a high resolution motion estimator ("HRME" output in line 143) and then a final time when the stabilized image frame data are compressed by the encoder 103.

FIG. 7 illustrates a very specific example of the image stabilization processing of FIG. 6. Although the low resolution block motion vectors (LRME) are calculated by block motion estimation circuits within the compression encoder 63 (FIG. 2), the high resolution motion vectors (HRME) are calculated in this specific example by the processor 51. However, both could instead be calculated by passing data through the dedicated circuits.

The image data processing shown in FIG. 7 occurs along a time line from time t=n−2 through t=n+1. Details of the stabilization of one acquired image frame of data are emphasized. At time t=n−2, image frame data S(n−2) output from the sensor has already been processed into a pre-stabilized image frame $S^V$(n−2) by use of a global motion vector earlier calculated between two prior successive acquired image frames. Before time t=n−1, the data of the image frame $S^{V-}$(n−2) are converted into a YUV format. The YUV image frame data are noted at time t=t−1 as $V^+$(n−1). After this, and before time t=n, a low-resolution image D(n) is formed (also referred to as a dc-image) from the YUV image data $V^+$(n−1). The low-resolution image D(n) is shown to exist at time t=n.

Digital stabilizer processing then occurs, using a low-resolution version D(n) of the current image and D(n−1) of the immediately preceding image frame. The digital stabilizer also receives data of the current full resolution image $V_i$(n−1), noted as input image $V_i^+$(n−1), and that of the immediately preceding frame $V_i^+$(n−2). The digital stabilizer performs the coarse and fine stabilization processing discussed above with respect to FIG. 6. At least the "Coarse ME (LRME)" processing block of the digital stabilizer of FIG. 7 is preferably implemented by passing the data through the dedicated block motion vector calculating capability of the data compression encoder circuits 63 (FIG. 2). The coarse global motion vector (GMV) is noted as $G_D$(n+1). The calculated output global motion vector, noted as G(n+1), is then used to stabilize the current full resolution image frame $V^+$(n−1) by cropping it into an image frame V(n+1). This then appears at time t=n+1 as an output of the stabilization processing of the current image frame. It is the data of this current image frame that are then compressed, using the same block motion vector calculating algorithm, preferably a dedicated circuit, which was earlier used twice by the digital stabilizer.

At the same time, the global motion vector G(n+1) calculated for the current image also processes data of a subsequently received sensor image frame S(n+1) to provide data of a pre-stabilized cropped image $S^{V-}$(n+1). This pre-stabilized image data then goes through the same processing steps as described for the current sensor image S(n−2). It will also be noted that the processing (not shown) of each of the cropped versions $S^{V-}$(n−1) and $S^{V-}$(n) of respective image frames S(n−1) and S(n) was begun at different times and partially completed while the current cropped image $S^{V-}$(n−2) was subjected to the stabilization processing. This processing parallelism by pipelining maintains the performance of the image frame data processing at a high level.

The digital stabilization processing shown in FIG. 7 will now be described in more detail. At frame time t(n−2), a sensor image S(n−2) is received. Only sub-image $S^{V-}$(n−2) is used to generate a YUV-image. During [t(n−2), t(n−1)], the YUV image frame $V^+$(n−1) is generated from $S^{V-}$(n−2) by the image processing unit (IPU) and the image scaler unit (ISU). During [t(n−1), t(n)], a dc-image D(n) is computed from $V^+$(n−1). During [t(n), t(n+1)], the digital stabilizer algorithm computes the global motion vector G(n+1). A first image cropper sets the location of $S^{V-}$(n+1) within the sensor image S(n+1), and a second cropper positions the YUV-image V(n+1) within the larger image $V^+$(n−1).

The following tasks shown in FIG. 7 are performed during the time frame [t(n), t(n+1)]:

1. Sensor image S(n+1), containing raw (2×2 pels in G, R, G, B format), is received and will be ready for further processing starting at t(n+1), where "pels" represent pixels.
2. YUV image $V^+$(n+1) is constructed, by the Image Processing Unit (IPU), and the Image Scaler Unit (ISC) from $S^{V-}$(n), a sub-image of the sensor image S(n).

The $V^+$ image is larger than the target image size (e.g., VGA). The extra area is used for cropping the target image at a new position that compensates for camera movements.

The size of $V^+$($V^+$_HorSize,$V^+$_VerSize) is a parameter, with maximum value limited by the bandwidth of the DRAM image frame buffer memory (e.g., VGA size image the maximum size 672 (H)×504 (V) pels). The aspect ratio of the VGA image remains at 640/480=672/504.

The IPU/ISC, takes a sub-section within the sensor image $S^{V-}$(n), then processes and converts it into a YUV-image $V^+$. The position within the $S^{V-}$(n) image frame is determined by the stabilizer coarse cropping output, which was the result of the last time frame [t(n−1), t(n)].

The relation between the size of $V^+$($V^+$_HorSize, $V^+$_VerSize) and the raw sensor image ($S^{V-}$_HorSize, $S^{V-}$_VerSize) is depended on the digital zoom factor in the V domain ZFv, as well as, the horizontal and vertical scaling factors, HorScale and VerScale, which scales the sensor image (e.g., 2000×200 pels) into an image with the required aspect ratio.

$V^+$_HorSize=ZFv*$V^-$_HorSize $V^+$VerSize=ZFv*$V^-$_VerSize where $V^-$_HorSize=HorScale*$S^{V-}$_HorSize $V^-$_VerSize=VerScale*$S^{V-}$_VerSize $V^-$ is the YUV-image before the digital zoom, with its horizontal and vertical size ($V^-$_HorSize, $V^-$_VerSize). Note, that $S^{V-}$ contains the sensor effective pixel area, as well as, the extra pixels at the edges of the sensor in each axis. In particular, when the digital zoom is one:

$S^{V-}$_HorSize=SensorEffPelHor+SensorExtraPelHor $S^{V-}$_VerSize=SensorEffPelVer+SensorExtraPelVer where, (SensorEffPelHor, SensorEffPelVer) and (SensorExtraPelHor, SensorExtraPelVer) are the number of effective and extra pixels in the horizontal and vertical axis, respectively. The aspect ratios of the image frames $V^+$ and $V^-$ are the same 3. A dc-image D(n+1) is generated from $V^+$(n) by the compression unit (CMP) 63 of FIG. 1.

Each 8×8 pels block is averaged and represented by a single dc-pixel. This 8:1 dc decimation will take only the central part of $V^+$. For a VGA resolution, the VGA central part within $V^+$ is taken. The size of D(n+1) is (640/8=80)×(480/8=60) dc-pels.

4. Low-resolution motion estimation (LRME) is performed on a target dc-image D(n), with D(n−1) as the reference dc-image.
  The result of the coarse LRME is a list of coarse $MV_{Dij}$ (n+1), where i=1, 2, . . . M, j=1, 2, . . . , N. For a dc-image of 80 (H)×60 (V) dc-pels, and an LRME_block size of 8 (H)×6 (V), a list of M×N=10× 10 block motion vectors ($MV_D$) are generated for each dc-image, one optimal $MV_D$ for each target unit.
5. A global coarse motion vector, GD(n+1) is computed by taking the median of all $MV_D$ vectors provided by the LRME unit.

$$G_D(n+1)=\text{median}\{MV_{Dij}(n+1), i=1, 2, \ldots M, j=1, 2, \ldots, N\}$$

Median on odd number (K) of items in the list of vectors will return the item of sorted list that (K−1)/2 items are above it and (K−1)/2 below it.
  Median on even number (K) of items in the list of vectors will return the average of the K/2 and K1/+1 of the sorted list.
6. A subset of best L (e.g., L 8) $MV_D$ motion vectors is then selected. The subset is the closest $MV_D$ vectors to the $G_D$ in the sense of dc-pel distance, as well as, taken from different parts of the image.
  First, all $MV_D$; vectors are sorted by their distance from $G_D$:

$$\text{distance}(MV_{Dij}, G_D)=\text{abs}(MV_{Dij}(n+1)-G_D(n+1))$$

Then, L vectors are taken as those with the minimum distance. Since they need to be taken from different parts of the image, the following condition is checked:
  When $MV_{Dij}$ and $MV_D$'s are two $MV_D$'s in the subset L vectors, located at the target image at (i,j) and (m,n), respectively,
  then, they are separated at least Thr LRME_blocks $$abs(i-m)<\text{Thr},$$

$$abs(j-n)<\text{Thr},$$

As a possible variation, LRME_block activity might help to select among two or more MVD motion vectors which have the same distance. Higher activity might increase the significance result of block matching in the fine resolution search. The LRME_block activity is calculated as the mean value of all block activity contained in the LRME block (48 blocks in 8×6 units). A single block activity is defined as the difference between the maximum and the minimum pel value in each 8×8 pel block.
7. The Fine GMV(n+1) is then calculated using $V^+(n-1)$ with $V^+(n-2)$ as target and reference images, respectively.
  A fine resolution search is performed around each $MV_{Di}$, where i=1, 2, . . . , L, using the LRME unit. In this stage, each entry in the fine target LRME_B lock is referring to a pixel in the target frame $V^+(n-1)$. Its location (upper-left corner) is currently taken at the central of the coarse LRME Block. (As a variation, since $MV_D(m)$ is common for many 8×6 pels units since the LRME block is in the coarse stage, it is possible to choose that 8×6 unit with the highest block activity.)
  The search area for VGA size, which contains 24×18 pels of the reference image $V^+(n-2)$, is constructed from 8 pels to the left, 8 to the right, 6 pels up and 6 pels down from an origin pel. This constructs 17×13 search points. The minimal sum-absolute-difference (SAD) of these search points results in the m-th fine $GMV_i(n+1)$, where i=1, 2 . . . , L.
  The fine global motion vector G(n+1) is the median of the $GMV_i(n+1)$:

$$G(n+1)=\text{median}\{GMV_i(n+1), i=1, 2 \ldots, L\}$$

8. Cropping $V^+(n+1)$ from $V^+(n-1)$: The cropping location of the VGA image V(n+1) from the $V^+(n-1)$ is determined by the global motion vector $G_D(n+1)$.
9. Set cropping location to $S^{V-}(n+1)$ from S(n+1): The new cropping position for the $S^{v-}(n+1)$ in the sensor image S(n+1) is also based on the current fine global motion vector $G_D(n+1)$ (and might be based on forward predictions of previous $G_D(n-i)$, i=1, 2, . . . .)
10. V(n+1) is forwarded to the display, if one exists, and to the video compression encoder frame buffer employed by the image capture device for compression and storage.

Motion estimation using the LRME unit is described next, with values taken for VGA size image as an example. The target dc-image is divided into non-overlapped LRME blocks, with an 8×6 dc-pels (H×V) block size. A set of 10×10 LRME blocks are constructed. The search result for each target LRME_block is the best coarse motion vector $MV_D$.

For each LRME_Block, a full search is performed on a 2D dc-pel grid. The grid is constructed from the coordinate locations of the target LRME_Block, (x0, y0), defined by its upper-left corner (upper-left L letter), to a maximum displacement in each horizontal and vertical of 8 and 6 dc-pels, respectively, as shown in FIG. 8. FIG. 8 shows a search area 24 (H)×18 (V) of a single LRME_Block unit (8×6 pixels), where X=a pixel in search area; L=a pixel of the target LRME_Block unit and the search area. A search grid of 17×13 is obtained from 17 search points in the horizontal and 13 points in the vertical axis. In all these 221 search points, the target LRME_Block unit is always inside the search area. The representative (optimum) MV of that target unit, is chosen as the one with the minimum SAD (sum absolute difference) between the target and the reference 8×6 pels.

The next target macro-block (MB) location in the target dc-image is taken from dc-pixel (x0+8, y0), in raster scan. Each dc-pel in the target dc-image is taken only once. Then, the next target units on the right are continued to be taken until the end of the dc-image: e.g., for VGA, 10 target units along one row. Then, the origin in the next strip will be at (x0, y0+6). There will be 10 targets units along each Column.

For the above LRME_block size, and a dc-image of 80×60, a list of 10×10 MVD motion vectors are generated for each dc-image, one optimal MV for each of the target units.

The coordinate conversion between the stabilizer output image (V) and the input sensor image (S) will now be described. The interface between the stabilizer operations and sensor structure is described. The determination of such an interface far each sensor structure allows the stabilizer algorithm to operate independently. FIG. 9 illustrates the process, showing zoom factors in the sensor (S) and output image (V) domains.

The horizontal and vertical scaling factors HorScale and VerScale scales the sensor image S (e.g., 2000×200 pels) into an image Vs with the required aspect ratio, which is expressed in the real pel domain:

$$Vs\_HorSize=HorScale*S\_HorSize$$

$$Vs\_VerSize=VerScale*S\_VerSize$$

In general, preparing the whole image Vs by the IPU & ISC (FIG. 7) is not required and only sub-section of it is processed.

The same scaling relations hold true for the $V^-$ image that can be obtained from the sub-sensor-image $SV-$:

$$V^-\_HorSize = HorScale * S^{V-}\_HorSize$$

$$V^-\_VerSize = VerScale * S^{V-}\_VerSize$$

A digital Zoom factor ZFs is defined for the sensor image, as:

$$Vs\_HorSize = ZFs * V^-\_HorSize$$

$$Vs\_VerSize = ZFs * V^-\_VerSize$$

Note that it is possible to define the effective area by setting its origin (the upper-left coordinates) and the horizontal and vertical size. Its aspect ratio might not agree with the aspect ratio of the output frame V. In such cases, ZFs will be used in either horizontal or vertical axis, but not both.

The digital stabilizer uses a scale up factor ZFv to obtain a larger image $V^+$ from the $V^-$ image:

$$V^+\_HorSize = ZFv * V^-\_HorSize$$

$$V^+\_VerSize\ ZFv * V^-\_VerSize$$

Once the sensor structure (its size and required scaling for required aspect ratio) and the operating digital zoom factor ZFs are determined, the zoom factor ZFv for the digital stabilizer can be calculated as:

$$ZFv = ZFs * V^+\_HorSize / Vs\_HorSize$$

$$= ZFs * V^+\_VerSize / Vs\_VerSize$$

The quantity ZFv is used to convert cropping coordinates from V image pel domain into the V-domain:

$$V^-(x,y) = V^+(x,y)/ZFv$$

The resolution in the sensor domain is 1/256 of pel.

The use of a minimum digital zoom factor (ZFv_min) will now be described. For proper operation of the digital stabilizer in maximum zoom out, a minimum margin should be left within the sensor image for motion compensation. An example margin is about +/−50 pels in each edge of the output image domain:

$$(Vs\_HorSize - V^-\_HorSize) * ZFv >= 2*50$$

$$(Vs\_VerSize - V^-\_VerSize) * ZFv >= 2*50$$

The lower limit of the operating digital zoom factor (ZFs_min) is given by:

$$ZFs\_min = max(1 + 100/V^+\_HorSize, 1 + 100/V^+\_VerSize)$$

Therefore, the operating digital zoom factor should maintain the condition:

$$ZFs >= ZFs\_min$$

The following example is given for a VGA sensor:

(Vs_HorSize, Vs_VerSize)(640, 480) pels (V+_HorSize, V+_VerSize) = (672, 504) pels ZFs_min = max(1+100/672, 1+100/504) = max (1.15, 1.20) = 1.20, and ($V^-$_HorSize_max, $V^-$_VerSize_max) = (Vs_HorSize, Vs_VerSize)/ZFs_min = (533, 400) pels.

Since ZFs >= ZFs_min is desired, ZFs = ZFs_min = 1.20 is selected. Then:

$$ZFv = ZFs * V^+\_HorSize/Vs\_HorSize = 1.20 * 672/640 =$$

$$= ZFs * V^+\_VerSize/Vs\_VerSize = 1.20 * 504/480 = 1.26$$

$$(Vs\_HorSize - V^-\_HorSize)*ZFv = (640-533)*1.26 = 134\ pels$$

$$(Vs\_VerSize - V^-\_VerSize)*ZFv = (480-400)*1.26 = 100\ pels$$

By this, an effective margin greater than 100 pels has been achieved.

Third Embodiment of Video Stabilization and Compression

As part of the second embodiment described above, a image frame S acquired from the sensor is cropped to a image frame $S^{V-}$ by the use of a global motion vector calculated from block motion vectors between two preceding image frames. Motion vectors from the current image frame are not used. Although this is a pre-stabilization step that is followed in the second embodiment by further stabilization processing based upon the current image frame, there are some applications where this amount of stabilization may alone be sufficient. This can be the case where the image frame acquisition rate is high, such as' thirty frames-per-second or more, and relatively slow shaking of the video device is expected, such as at a frequency of three Hertz or less. A significant advantage is the greatly reduced amount of data processing that is required for motion stabilization.

Therefore, a processing system such as shown in FIG. 10 may be employed. A compression encoder 151 includes a section 153 that calculates block motion vectors of the individual image frames received by the encoder, preferably at least in part by a dedicated hardware circuit, and a section 155 that performs the remaining compression encoding calculations, as before. The compression encoding is also preceded by image motion stabilization processing 157. What is different in this third embodiment is that the motion stabilization processing uses block motion vectors calculated by the section 153 for an image frame prior to the current frame that is being stabilized, with respect to yet an earlier frame. A global motion vector for the current frame is then calculated at 156 and used to stabilize the current image frame at 157.

By this method, block motion vectors calculated from two image frames acquired before the current image frame in order to compress the data of the most recent prior image frame are then also used to stabilize motion of the current image frame. The two prior image frames will most commonly be the two immediately preceding in time the current image frame but that is not a requirement. Other pairs of prior image frames may be used instead. Since data of the current image frame are not used to calculate its motion vectors, the global motion vector can be available near the same time that data for the current image frame are acquired, or very shortly thereafter. This reduces the number of block motion vector calculations by at least one for each image frame.

Conclusion

Although the various aspects of the present invention have been described with respect to exemplary embodiments thereof, it will be understood that the present invention is entitled to protection within the full scope of the appended claims.

It is claimed:

1. A method for enabling an apparatus to generate a video output, comprising:

employing a lens and a sensor to acquire video data that includes a plurality of images acquired over time, and performing actions on each acquired images, including:

determining a first global motion vector for a current image based on detected coarse motion between a low resolution version of the current image and at least one of a plurality of earlier acquired images having a resolution that is relatively lower than the current image;

cropping an intermediate video frame from the current image, wherein the intermediate video frame is repositioned within a region of the current image to compensate for the detected coarse motion based on the determined first global motion vector;

determining a second global motion vector for the intermediate video frame based on detected fine motion between the intermediate video frame and at least one earlier intermediate video frame;

cropping a video frame from the intermediate video frame, wherein the video frame is repositioned within a region of the intermediate video frame to compensate for the detected fine motion based on the determined second global motion vector; and compressing the video frame based on the determined first global motion vector; and generating a video output that includes a plurality of the compressed video frames over time.

2. The method of claim 1, further comprising employing a low resolution version of earlier acquired images to detect coarse motion and determine the first global motion vector for the current image.

3. An integrated circuit for enabling an apparatus to generate a video output, comprising:

a memory component that stores at least instructions; and a processing component that executes instructions to enable a plurality of actions, including:

enabling a lens and a sensor to acquire video data that includes a plurality of images acquired over time, and performing actions on each acquired image, comprising:

determining a first global motion vector for a current image based on detected coarse motion between a low resolution version of the current image and at least one of a plurality of earlier acquired images having a resolution that is relatively lower than the current image;

cropping an intermediate video frame from the current image, wherein the intermediate video frame is repositioned within a region Of the current image to compensate for the detected coarse motion based on the determined first global motion vector;

determining a second global motion vector for the intermediate video frame based on detected fine motion between the intermediate video frame and at least one earlier intermediate video frame;

cropping a video frame from the intermediate video frame, wherein the video frame is repositioned within a region of the intermediate video frame to compensate for the detected fine motion based on the determined second global motion vector; and compressing the video frame based on the determined first global motion vector; and generating a video output that includes a plurality of the compressed video frames over time.

4. The integrated circuit of claim 3, wherein the actions further comprise employing a low resolution version of earlier acquired images to detect coarse motion and determine the first global motion vector for the current image.

5. A system for generating a video output, comprising:

a lens;

a sensor for acquiring an image projected by the lens onto the sensor;

a memory component for storing at least instructions; and a processing component that executes the instructions to enable a plurality of actions, including:

enabling the lens and the sensor to acquire video data that includes a plurality of images acquired over time, and performing actions on each acquired image, comprising:

determining a first global motion vector for a current image based on detected coarse motion between a low resolution version of the current image and at least one of a plurality of earlier acquired images having a resolution that is relatively lower than the current image;

cropping an intermediate video flame from the current image, wherein the intermediate video frame is repositioned within a region of the current image to compensate for the detected coarse motion based on the determined first global motion vector;

determining a second global motion vector for the intermediate video frame based on detected fine motion between the intermediate video frame and at least one earlier intermediate video frame;

cropping a video frame from the intermediate video frame, wherein the video frame is repositioned within a region of the intermediate video frame to compensate for the detected fine motion based on the determined second global motion vector; and compressing the video frame based on the determined first global motion vector; and generating the video output that includes a plurality of the compressed video frames over time.

6. The system of claim 5, wherein the actions further comprise employing a low resolution version of earlier acquired images to detect coarse motion and determine the first global motion vector for the current image.

7. A processor readable non-transitory storage media that is arranged to store executable instructions, wherein an execution of the stored instructions enables a plurality of actions for generating a video output that is motion compensated, the plurality of actions comprising:

enabling a lens and a sensor to acquire video data that includes a plurality of images acquired over time, and performing actions on each acquired image, comprising:

determining a first global motion vector for a current image based on detected coarse motion between a low resolution version of the current image and at least one of a plurality of earlier acquired images having a resolution that is relatively lower than the current image;

cropping an intermediate video frame from the current image, wherein the intermediate video frame is repositioned within a region of the current image to compensate for the detected coarse motion based on the determined first global motion vector;

determining a second global motion vector for the intermediate video frame based on detected tine motion between the intermediate video frame and at least one earlier intermediate video frame;

cropping a video frame from the intermediate video frame, wherein the video frame is repositioned within a region of the intermediate video frame to compensate for the detected fine motion based on the determined second global motion vector; and compressing the video frame based on the determined first global motion vector; and generating a video output that includes a plurality of the compressed video frames over time.

8. The processor readable non-transitory storage media of claim 7, wherein the actions further comprise a low resolution version of earlier acquired images to detect coarse motion and determine the first global motion vector for the current image.

* * * * *